Jan. 3, 1933.   H. S. GOODMAN   1,893,364
ATTACHMENT FOR SAVINGS BANKS
Filed April 18, 1932
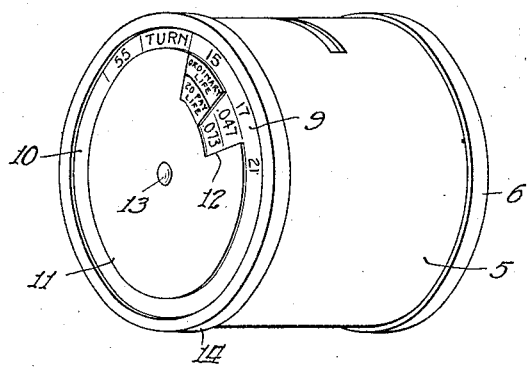
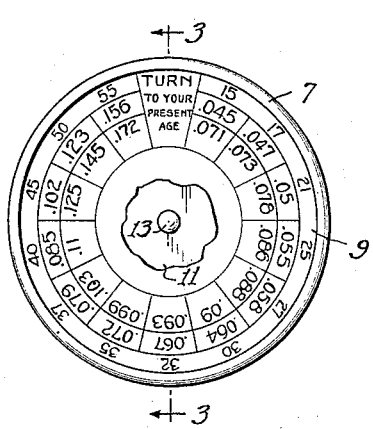
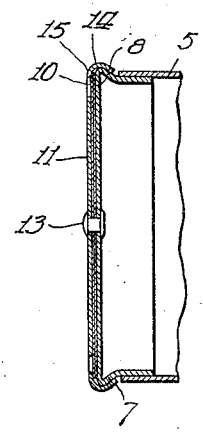
Inventor
Harry S. Goodman
By Zabel & Banning
Attys.

Patented Jan. 3, 1933

1,893,364

UNITED STATES PATENT OFFICE

HARRY S. GOODMAN, OF CHICAGO, ILLINOIS

ATTACHMENT FOR SAVINGS BANKS

Application filed April 18, 1932. Serial No. 605,897.

My invention relates to attachments for savings banks and particularly to a means for mounting and utilizing a chart on the savings bank to make available certain information of interest to the user of the savings bank.

More specifically it is a purpose of my invention to provide an attachment of this character embodying a chart fixed directly on the bank and a dial also pivoted on the bank in such form that a smooth surface overlies the chart so as to engage with a smooth back surface on the dial.

I will describe the preferred form of my invention by reference to the accompanying drawing wherein—

Fig. 1 is a perspective view of a bank embodying my invention;

Fig. 2 is a top plan view showing the chart with the dial broken away; and

Fig. 3 is a section on the line 3—3 of Fig. 2.

Referring now in detail to the drawing, the bank 5 is in the present form composed of a cylindrical body portion and substantially circular end portions 6 and 7. The end portion 7 may be either removable as a cover or fixed to the cylindrical portion 5. This end portion provides the means whereby the chart and dial attachment are applied to the bank.

One of the advantages desired in a device of this character is to get a dial that can be easily turned and will still remain in position where it is left.

Another desirable feature is to keep the thickness of dial and chart down to a minimum.

In order to get these results, and also to have the chart and dial both facing outward, I mount the chart member 8 on the member 7. This chart member may constitute an additional strip laid on the member 7 or a formation directly in the member 7 laying out the material to be made available. The information on the chart in the present instance happens to show the amount of money that must be saved daily to buy $1,000 worth of insurance at different ages given in the outer margin of the line at 9 for example in Fig. 2. The specific information shown on the chart, however, is not of particular importance. The chart 8 is covered with a transparent layer of material 10 which will provide a smooth exterior bearing surface. I find that the smooth outer surface can best be obtained by the utilization of a very thin layer of celluloid or a similar compound. The dial 11 having the cut-out portion at 12 must be made of a material capable of receiving instructions for using the information on the chart on its outer surface, and it also must provide a smooth inner surface to bear upon the smooth exposed surface of the celluloid. I find that I can make the dial of a suitable metal such as brass, and, upon polishing the interior surface, it works very well on a celluloid and is particularly good in that, contrary to the usual expectations, it does not scratch the smooth exterior celluloid surface enough to injure the vision therethrough of the chart beneath the celluloid. The metal sheet of which the dial is made can also be very thin, and it is directly secured to the member 7 by a suitable pivot such as the rivet 13. The chart 8 and its transparent covering 10 are preferably bound to the member 7 at their edges by the metallic ring 14 which is spun over their outer edges as indicated at 15.

From the above description, it is believed that the construction and advantages of this device will be clear to those skilled in this art.

Having thus described one specific form of my invention, what I claim as new and desire to secure by Letters Patent is:

1. The combination with a receptacle including a wall of an information displaying device mounted on said wall, said device comprising an indicia bearing member, a transparent cover therefor protecting said member and the indicia thereon, an indicator disk overlying said cover and having a relatively small portion thereof cut out to expose indicia on said member to view, and means securing said disk for rotation on said cover, said disk and cover having large smooth opposing surfaces for contact whereby to minimize damage to the transparency of said cover by said disk.

2. The combination with a receptacle including a wall of an information displaying device mounted on said wall, said device comprising an indicia bearing member, a transparent flexible cover therefor protecting said member and the indicia thereon, an indicator disk of relatively soft metal such as brass overlying said cover and having a relatively small portion thereof cut out to expose indicia on said member to view, and means securing said disk for rotation on said cover, said disk and cover having large smooth opposing surfaces for contact whereby to minimize damage to the transparency of said cover by said disk.

3. The combination with a receptacle including a wall of an information displaying device mounted on said wall, said device comprising an indicia bearing member, a transparent flexible cover therefor protecting said member and the indicia thereon, an indicator disk overlying said cover and having a relatively small portion thereof cut out to expose indicia on said member to view, and means securing said disk for rotation on said cover, said disk and cover having large smooth opposing surfaces for contact whereby to minimize damage to the transparency of said cover by said disk, said surfaces being held in close engagement by the disk securing means.

4. An information displaying attachment for coin receptacles adapted for use as individual coin savers, for displaying on said receptacles the amount of periodical deposits necessary to accomplish an indicated purchase in an indicated time, said attachment having an indicia bearing sheet, a transparent cover for said sheet protecting the sheet and the indicia thereon, said cover being of flexible material and of a thickness sufficient to retain its shape and prevent wrinkling or tearing in use, and an opaque indicating disk slotted to remove a small portion thereof to display small portions of said indicia to view, a central pivot for said disk securing it against said cover, the disk and cover having smooth opposing surfaces for minimizing scratching of the cover and excluding foreign matter from between the cover and disk.

In witness whereof, I hereunto subscribe my name this 24th day of Mar. A. D. 1932.

HARRY S. GOODMAN.